Patented Nov. 18, 1952

2,618,615

UNITED STATES PATENT OFFICE 2,618,615

FORMING SILICA-CONTAINING GEL PARTICLES INTO STRONG TABLETS

Gerald C. Connolly, Baltimore, Md., assignor to Standard Oil Development Company, a corporation of Delaware No Drawing. Application January 24, 1949, Serial No. 72,551

10 Claims. (Cl. 252—449)

This invention relates to a method of preparing siliceous catalysts and siliceous adsorptive materials and more particularly to a process whereby the physical form or shape of the catalyst or adsorptive material is improved.

Catalysts and adsorptive materials prepared for commercial or laboratory processes that contain silica, or those formed using silica as a base, are very numerous in the catalytic art. Polymerization, isomerization, reforming, oxidation, esterification, dehydrogenation, hydrogenation, and catalytic cracking are some of the long list of reactions that involve catalysts in which silica plays a major part. Catalytic substances containing silica or silica based catalysts are used in a substantial number of the processes involving conversion of hydrocarbons. Some of these substances are silica catalysts, silica-alumina catalysts, magnesia-silica catalysts, magnesia-silica-alumina catalysts, silica-vanadia catalysts, etc.

Siliceous materials are used to a great extent also in processes involving the principle of adsorption. Semi-bentonitic clays are made active by an acid treatment or other porous siliceous materials, preferably those siliceous materials with pores that are ultra microscopic in size have broad and well known uses in industrial and experimental techniques.

These siliceous materials are ordinarily prepared for use in industrial or experimental processes in the form of a powder. For instance, the "natural earths," such as semi-bentonitic clays are mined, washed and ground. The synthetic adsorbent catalytic materials are usually prepared in the form of a hydrogel or gelatinous precipitate and then washed, dried and ground. Both the natural earths and synthetic adsorbent and catalytic gels are sometimes used in the form of a powder but often it is desired to use these materials in the form of pills, pellets, or tablets. For example, in bed type conversion and adsorption processes it is advantageous to use the materials in the form of larger particles. These larger particles such as pills or pellets or tablets eliminate many of the technical difficulties inherent in powders, such as attrition losses, difficulty in handling, and the like. Also it may be desirable to "nodulize" extremely fine catalytic or adsorbent particles. By this procedure extremely fine particles are formed into pills, pellets or tablets and then ground into particles of a desired size. For example, Cottrell fines may be "nodulized" by pilling them into larger pellets and then grinding them to the desired size for reuse in a fluid cracking process.

These pills or pellets have, in the past, been formed from the powdered catalyst or adsorptive material by adding to the powder a bonding agent such as graphite, stearic acid, etc. and then forming the pill or pellet as desired by a process of pilling, extruding or tableting the mixture of catalytic or adsorptive material and the bonding agent. Ordinarily the resultant particles are not of sufficient hardness to resist attrition and abrasive destruction of the particle size and shape that accompanies handling and use in industrial or experimental operations. It is usually necessary to grind the particles, add more binding agent, and reform the particles, the process being repeated in order to increase the hardness of the pill, pellet, or tablet. This operation may be repeated three or four times, more bonding agent being required in each repetition, until particles of the desired hardness are obtained. Even then, the final product is none too satisfactory, as it often loses hardness when the bonding material is burned off in drying.

The object of this invention is to eliminate the necessity for the addition of bonding agents and to form particles of the catalytic or adsorptive materials of a sufficient hardness to resist attrition or destruction of particle size and shape by abrasive action or other handling or operational erosion by a single process of pilling, extruding or tableting.

As a further object, this invention provides for the formation of particles of the catalytic or adsorptive materials of desired hardness in an operation which is of great economic advantage.

The method is concerned with the treatment of the siliceous catalytic or adsorptive materials with a weak solution of a volatile base. The material treated may be any silica or silica-based catalyst such as silica, silica-alumina, silica-magnesia, silica-alumina-magnesia, silica-vanadium oxide, silica-zirconia, fuller's earth, diatomaceous earth, kieselguhr and the like. The volatile base used for treating may be a dilute solution of ammonium hydroxide, ammonium carbonate, ammonium sulphite, etc. substituted ammonium hydroxide as tetramethyl or tetraethyl ammonium hydroxide, etc. or suitable amines, preferably the various ethanol amines, etc.

The treatment, which occurs before the bonding operation, causes a superficial reversion of the hard surface of the particles. Reversion as the name implies is the tendency to revert a dried gel back to the hydrogel and then to the hydrosol. If the treatment is sufficiently drastic, all the dried gel will eventually be converted into the sol. In this invention the action is halted in the stage in which the outer surface and perhaps the surface of the wide pores is converted to the hydrogel. This means that there is formed a nucleus of the dried gel coated with a jelly, which jelly is the binding force and interlocks the particles when the mass is dried. Naturally, the jelly formed is converted into the dried gel once more during the drying and heating steps. This formation of a bonding agent from the outer particle surface is of great economic advantage since it permits the direct forming of larger particles by pilling, tableting, extruding, etc. without the addition of a bonding agent.

The method is generally applicable but is particularly useful for treating very dense and hard silica gels, impregnated gels, mixed or plural silica gels or natural products such as adsorbent clays. Also it is particularly applicable to those products that have been shrunk and hardened by heating at elevated temperatures, for example, the discarded powdered catalyst from fluid catalytic cracking units, overheated clays, etc.

A solution of ammonium hydroxide of a strength within a range of 1% to 5% by weight preferably 1 to 2% has been found satisfactory for use in this process. Ammonium carbonate, ammonium sulphite, alkyl substituted ammonium hydroxide and certain organic amines such as the ethanolamines can be used. Non-volatile alkalis such as those of Na, K, etc. should not be used because they cannot be removed and usually seriously impair the activity, the capacity, and the regenerative properties of the catalyst or adsorbent.

The amount of ammonium hydroxide necessary will vary somewhat with the type of material to be treated, and the manner in which it has been used or prepared, but normally, as with dense silica-alumina cracking catalyst, moistening the powder with a one per cent solution of ammonium hydroxide is quite sufficient. The moistening technique consists of just wetting the powdered sample which is preferably within a range of from 100 to 300 mesh with sufficient solution so that there is no free solution that can be poured off. Should too much solution be added, the excess, of course, can be driven off by heat. What is desired is that every particle of the gel be saturated and the external surfaces wetted with the solution.

However, it may be desirable to digest the powder for a period of time, say several hours, preliminary to the forming. Also it is often necessary to partly dry the treated siliceous material before pilling, the reason being that there is an optimum amount of moisture necessary for the mechanical feeding and for the suitable lubrication during the bonding of the pill. With a synthetic $SiO_2.Al_2O_3$ catalyst, the best amount of moisture for pilling is between 20% to 30% by weight. When extruding, a considerably greater quantity of moisture is normally used. Excessive ammonium hydroxide should not be used because it will harm the structure. The amount of ammonium hydroxide that is added to the material to be treated varies between 1% to 5% by weight, the amount used depending upon the structure and condition of the material to be treated. For the less porous and more resistant materials, 5% by weight of the ammonium hydroxide solution would be the maximum amount, while 1% or even less might be sufficient for the less resistant, more porous substances.

As has been pointed out above, the degree of reversion is affected by the type of treatment to which the siliceous material is subjected, as well as the strength and amounts of the reverting solution used. The material may be treated with the reverting solution under pressures above atmospheric so that the solution does not evaporate, or when treating the material at atmospheric pressure, a reflux system may be used to condense the vapors of the reverting solution and return the condensate to the materials for further use. The temperature at which the reversion is carried out also affects the degree of reversion, that is, as the temperature rises, volatility of the reverting solution increases and residence time is decreased. The preferred temperature for the reversion is one below the boiling point of water, about 150–175° F.; however higher or lower temperatures may be used.

Of the methods listed above, that is digesting or reverting under pressure, or at atmospheric pressure, with or without a reflux system, digesting at atmospheric pressure using a reflux system is the most drastic. Using constant temperatures and a reverting solution of the same strength, a greater degree of reversion will be experienced by using a reflux system to condense the reverting solution vapors and return them to the digesting receptacle.

The preferred method of digesting, however, is the moistening technique. Using this technique the powder is just wetted with a sufficient amount of the reverting solution so that there is no free excess of solution that can be poured off. The treated gel is then allowed to stand from 1–3 hours before drying down to the 20–30% moisture content desired. There is, of course, some further digesting during the drying period. This drying period is usually from 1–2 hours at a temperature within a range of about 150–300° F. and the treated material is then activated by heating to a temperature within a range of 500–1000° F., depending upon the use to which the material is to be put.

The following is an example of one embodiment of this invention.

*Example*

A silica-alumina powdered catalyst containing 12½% aluminum oxide on silica gel was made in the following manner: a sodium silicate solution was reacted with an acid solution in such manner that a clear silica hydrosol was formed which set to a firm hydrogel in from 1 to 5 hours. This hydrogel was broken up into lumps averaging about 1″ diameter and then washed with water to remove the reaction impurities. The washed hydrogel was drained and then soaked in an aluminum sulfate salt solution until uniformly impregnated. It was then thoroughly drained and soaked in an ammonium hydroxide solution until reaction was complete between the aluminum salt within the hydrogel and the ammonium hydroxide. By the action of the ammonium hydroxide solution, gelatinous alumina was precipitated throughout the interior of the silica hydrogel. The alumina impregnated silica hydrogel was washed to remove reaction salts and then dried and ground.

A portion of this powdered catalyst was then pilled in a Stokes tableting machine to $\frac{3}{16}$″, "T"-type tablets. These "T"-type tablets were then dried by heating to about 300° F. in a steam jacketed type of drier for about 8 hours, and then ground. Water was then added to the ground material to bring the total moisture content to 20 to 30%, stearic acid was added as a bonding agent and the powder was then reformed in the tableting machine. This operation, the regrinding of dried formed particles followed by the addition of the bonding agent and reforming into particles, referred to in the art as a "slugging" operation was repeated three times. After the final drying operation and activation for 3 hours at 850° F., it was found that the tablets were still very crumbly having a crushing strength at best of 2 pounds, side, and 3 pounds, end. The crushing strength could not be further improved by continuing the slugging. Tested for cracking activity using an East Texas gas oil of 33.8 A. P. I. gravity at a feed rate of 0.6 volume of feed stock per volume of reaction zone per hour at 850° F. for 2 hours, the catalyst gave a naphtha of 49 A. P. I. gravity and 58% gasoline (D+L).

A second portion of the powdered catalyst was just moistened with a one per cent solution of ammonium hydroxide, allowed to stand for an hour and then dried by heating to 300° F. This sample after the addition of 20 to 30% water was pilled without slugging, giving $\frac{3}{16}$", "T"-type tablets having a crushing strength after activation for 3 hours at 850° F. of 8 to 10 pounds side and 9 to 12 pounds, end. This crushing strength is satisfactory for most commercial bed-type converters. Tested as above for cracking activity, using East Texas gas oil of 33.8 A. P. I. gravity at a feed rate of 0.6 volume of feed stock per volume of reaction zone per hour at 850° F. for 2 hours, the catalyst gave a naphtha of 50.3 A. P. I. gravity and 60% gasoline (D+L).

This example shows that in addition to the greatly simplified particle formation technique and its obvious economic advantage, the ammonium hydroxide treatment was beneficial to the cracking activity.

What is claimed is:

1. In a process for forming siliceous particles of relatively superior average size the improvement which comprises treating smaller synthetic silica-containing gel particles with a solution of about 1 to 5% concentration by weight of a volatile non-metallic nitrogen containing base in quantity sufficient to fully wet said gel but not in substantial excess, said treatment being carried out for a period of time sufficient to substantially soften the surface but not completely convert said smaller gel particles to a sol and thereby make said particles cohesive, and thereafter pressing the treated gel into particles of superior size.

2. A process according to claim 1 in which the solution used is a one per cent solution of ammonium hydroxide.

3. A process according to claim 1 in which the solution used is a solution of ammonium hydroxide of a strength of from 1% to 5%.

4. In a process for forming siliceous particles of relatively superior average size the improvement which comprises treating smaller synthetic silica-containing gel particles with a solution of about 1 to 5% concentration by weight of a volatile non-metallic nitrogen containing base in quantity sufficient to fully wet said gel but not in substantial excess, said treatment being carried out for a period of time sufficient to substantially soften the surface but not completely convert said smaller gel particles to a sol and thereby make said particles cohesive, pressing the gel into particles of superior size and heat treating said particles to give them superior strength.

5. A process according to claim 4 in which the ammonium hydroxide solution is of a strength of from 1% to 5%.

6. A process according to claim 4 in which the siliceous material is a silica gel.

7. A process according to claim 4 in which the siliceous material is any cogel containing silica gel.

8. A process according to claim 4 in which the ammonium hydroxide solution is a one per cent solution.

9. Process for formation of catalyst particles of superior size and strength of synthetic silica alumina gel which comprises treating smaller particles of said gel with a quantity just sufficient to fully moisten said gel of about 1% aqueous solution of ammonium hydroxide for a time sufficient to soften the surface of said smaller particles, drying the treated material, adding sufficient water to the dried material to bring total moisture content of the gel up to about 25% by weight, pressing the thus treated gel into particles of larger size, and drying and activating the catalyst so formed.

10. A process according to claim 9 in which the drying temperature is 300° F. and the activation temperature is 850° F.

GERALD C. CONNOLLY.

REFERENCES CITED

The following references are of record in the file of this patent:

UNITED STATES PATENTS

| Number | Name | Date |
|---|---|---|
| 1,835,420 | Neundlinger | Dec. 8, 1931 |
| 2,079,854 | Hartshorne | May 11, 1937 |
| 2,146,718 | Bond | Feb. 4, 1939 |
| 2,296,406 | Spicer et al. | Sept. 22, 1942 |
| 2,300,106 | Connolly | Oct. 27, 1942 |
| 2,326,706 | Thomas et al. | Aug. 10, 1943 |
| 2,391,050 | Van Horn | Dec. 18, 1945 |
| 2,435,379 | Archibald | Feb. 3, 1948 |
| 2,484,258 | Webb | Oct. 11, 1950 |